United States Patent [19]

Delano et al.

[11] Patent Number: 5,095,052
[45] Date of Patent: Mar. 10, 1992

[54] LOW IMPULSE COATINGS

[75] Inventors: Chadwick B. Delano; Michael R. McHenry, both of Sunnyvale, Calif.

[73] Assignee: The United States of America as represented by the Secretary of the Air Force, Washington, D.C.

[21] Appl. No.: 545,268

[22] Filed: Jun. 28, 1990

[51] Int. Cl.$^5$ .......................... C08K 3/04; C08L 63/00
[52] U.S. Cl. ..................... 523/454; 523/468; 524/361; 524/495; 524/496; 524/590
[58] Field of Search ............... 523/454, 468; 524/361, 524/590, 495, 496

[56] References Cited

U.S. PATENT DOCUMENTS

| | | | |
|---|---|---|---|
| 4,481,057 | 11/1984 | Beard | 156/83 |
| 4,561,863 | 12/1985 | Hashimoto et al. | 51/298 |
| 4,686,128 | 8/1987 | Gentilman | 428/44 |
| 4,728,529 | 3/1988 | Etzkorn et al. | 427/39 |
| 4,734,339 | 3/1988 | Schachner et al. | 428/701 |
| 4,749,594 | 6/1988 | Malikowski et al. | 427/190 |
| 4,898,922 | 2/1990 | Shiraki | 528/65 |

Primary Examiner—Paul R. Michl
Assistant Examiner—Edward J. Cain
Attorney, Agent, or Firm—Irwin P. Garfinkle; Donald J. Singer

[57] ABSTRACT

The high sublimation energy of industrial diamond pigment is combined with the clean ablation properties of an epoxy or urethane binder. The result is a low impulse decoy coating that has the desired compatibility with the decoy heat shield materials, good radar transmission, and a neutral effect on the electron densities in the wake. A high volume fraction of the diamond pigment is required to substantially reduce the blow-off impulse. The coating for a carbon-carbon substrate is a mixture of diamond pigment and a urethane or epoxy binder. Good quality, strong adherent coatings for a low-impulse decoy were fabricated in the range of 85 to 90 weight percent of diamond for both urethane and epoxy.

6 Claims, 1 Drawing Sheet

LOW IMPULSE COATINGS

STATEMENT OF GOVERNMENT INTEREST

The invention described herein may be manufactured and used by or for the Government for governmental purposes without the payment of any royalty thereon.

BACKGROUND OF THE INVENTION

This invention relates to a new material composition which provides low blow-off impulse in a high dose x-ray environment.

When launching a massive missile strike, the reentry vehicles are accompanied by decoys, the purpose of which is to saturate the enemy defenses. Advanced reentry vehicle decoys are designed to produce radar signatures that cannot be distinguished from the signatures of the accompanying reentry vehicles. The reentry vehicle features that are used as discriminants are: (1) deviations in trajectory, (2) the dynamic radar cross section of the body, and (3) the radar cross section of the wake. It is important that all of these features be simulated by the decoy.

The likely defense against a cloud of incoming reentry vehicles and decoys would be a nuclear attack, ridding the cloud of some objects and producing a discriminating response between reentry vehicles and decoys. The defense could then zero in on and intercept only the reentry vehicles and avoid saturation.

All of the nuclear environments (photons, neutrons, blast, thermal, etc.) pose a threat at some altitude for either the active or passive body decoy concepts. The photon environment in the X radiation band poses a severe exo-atmospheric threat to both decoy concepts because it produces an external impulsive load on the decoy body. The external impulse can cause changes in the decoy motion, or actually damage the decoy, to the extent that it can be distinguished from the reentry vehicle. It is vital, therefore, to minimize the impulsive load.

The external impulsive load produces two effects. First, coning results because the decoy center-of-mass varies with exposure angle and external material distribution. Excessive coning can be seen in the decoy dynamics radar cross section which distinguishes it from the reentry vehicle. Excessive coning may also increase aerodynamic drag, changing the decoy trajectory and degrading metric simulation.

Second, the impulse load can induce dynamic response of the decoy, causing damage or failure of the structure and nose tips. Constraints placed on the decoy weight and reentry vehicle simulation requirements make it particularly difficult to strengthen the structure and nose tip sufficiently without compromising other performance factors. A reduction in the impulse load, therefore, can be of significant benefit to the overall system performance.

Impulse is produced by "cold" X-rays in the outermost decoy material. It is feasible to reduce the impulse load by applying a thin coating of low impulse material over the entire decoy. Besides generating a low X-ray impulse, the coating must also satisfy a number of other requirements to be consistent with the required decoy performance. These requirements are summarized as follows:

1. Good Adhesion

The decoys must survive multiple X-ray bursts and, therefore, the coating must not be removed by the first burst. This requires a strong coating with good adhesion to the substrates. The thermal expansion of the coating must also be consistent with that of the decoy substrates so that thermal cycling will not damage the coating.

2. Low Radar Losses

The decoys contain antenna systems and other features to control the return signal of the threat radar. Therefore, the coating must allow transmission of radar signals at temperatures ranging from ambient to ablation temperature. This requires that the coating have a low dielectric constant and a low loss tangent.

3. Effect of Wake

The decoys are required to simulate the reentry vehicle wake during reentry. This is done by controlled ablation of seedant materials in passive decoy concepts and by electrical simulation of the wake return for active decoy concepts. In both cases, having the coating neutral in the wake is preferred. The relevant material properties are the ionization potential and the electron affinity of the ablation products. The passive decoy requires coating materials with low electron affinity so that the wake created by the seedant will not be quenched. Active decoy concepts require that the wake be quenched so that it does not interfere with the electronic simulation.

4. Ablation Performance

The passive decoy design requires that the overlay coating be removed by ablation at a high altitude so that the wake control layer can be exposed and ablated to modulate the wake. In addition, the high altitude drag and the related beta coefficient are controlled by increased beta. Unfortunately, the properties that result in low impulse (high sublimation energy, high specific heat) are inconsistent with the properties required for high blowing (low sublimation energy, low specific heat). The ablation of the coating must not generate large particles in the wake that could result in a discriminant.

5. Weight And Volume Constraints

The thickness of the coating is determined by the need to provide shielding of the substrate materials under the coating. In general, the higher the atomic number of the elemental composition and the higher the coating density, the thinner the coating can be. Other factors determining thickness include the elemental composition and melt energy of the substrate. Higher atomic number and low melt energy substrates will require thicker coatings. Multi-burst requirements and shock wave interactions also affect the require coating thickness. Ultimately, the thickness and weight of the coating must be consistent with the weight and volume requirement of the decoy system.

6. Optical Signature

The optical signature of the decoy should match that of the reentry vehicle, but this is difficult to achieve because the surface area of the decoy is much smaller than that of the reentry vehicle.

7. Materials and Manufacturability

The coating materials should be readily available at reasonable cost and should be capable of manufacturing using standard procedures, and toxic materials should be avoided.

OBJECT OF THE INVENTION

The object of this invention is to provide an X-ray hardened, low blow-off impulse adherent coating for survivable reentry vehicle decoys.

Another object of this invention is to provide an X-ray hardened, low blow-off impulse adherent coating for survivable reentry vehicle decoys, which coating does not contribute to plasma or significantly change the required optical and radar cross section characteristics of the decoy.

It is yet another object of this invention to provide an overlay material for a decoy, which material has the ability to perform in numerous other functional area in addition to nuclear hardening and survivability.

Still another object of this invention is to provide an overlay which combines the high sublimation energy of industrial diamond pigment with the clean ablation properties of an epoxy or urethane binder.

BRIEF DESCRIPTION OF THE DRAWINGS

For further objects and advantages of this invention reference should now be made to the following detailed specification and to the accompanying drawings in which.

DESCRIPTION OF THE PREFERRED EMBODIMENTS OF THE INVENTION

X-ray induced blow-off impulse is related to the sublimation energy of the coating and the magnitude of the absorbed dose (which increases with the atomic number). Therefore, a low impulse coating should have a high sublimation energy and a low atomic number. Refractory materials such as carbon, boron nitride, boron carbide and various beryllium compounds fall into the category of low impulse materials, however, these refractory materials do not ablate rapidly enough to remove the coating at a critical altitude to allow the release of wake enhancing seedants from the heat shield. In addition, the coating must be compatible with the thermal expansion of the various substrate materials used in the decoys. Other requirements are the transmission of radar and that the ablation products must be neutral to the ionization in the decoy wake.

This invention combines the high sublimation energy of industrial diamond pigment with the clean ablation properties of an epoxy or urethane binder. The result is a low impulse decoy coating that has the desired compatibility with the decoy heat shield materials, good radar transmission, and a neutral effect on the electron densities in the wake. A high volume fraction of the diamond pigment is required to substantially reduce the blow-off impulse.

Figure 1:
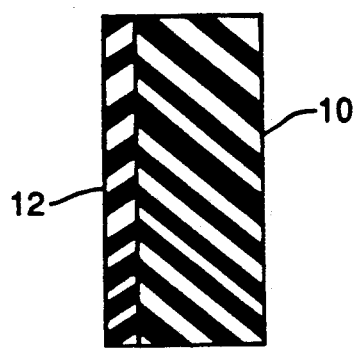
FIG. 1 is a schematic cross section of a coating of the material on a substrate.

FIG. 1 shows a carbon-carbon substrate 10 to which a coating 12 has been applied in accordance with this invention. The coating 12 for the carbon-carbon substrate 10 is a mixture of diamond pigment and urethane or epoxy binder. Good quality, strong adherent coatings for a low-impulse decoy were fabricated in the range of 85 to 90 weight percent of diamond for both urethane and epoxy. While a binder of epoxy provided good results, urethane is preferred because its elastomeric properties allow it to adjust to the thermal expansion of the carbon-carbon substrate material. The urethane used in fabricating the coatings is a commercial, off the shelf product, obtained from Resin Formulators Company of Culver City, Calif. It is designated by the supplier as RF-1735, a two component, elastomeric potting compound. It is mixed to the ratio of 37 parts by weight of 1735, Part A, and 63 parts by weight of 1735, Part B.

The feasibility of the invention has been demonstrated by fabricating diamond-epoxy and diamond-urethane coatings with up to 90 weight percent diamond using approximately 20 micron diameter industrial diamond powder. The coating is applied to the carbon-carbon substrate in the uncured state after it is mixed and rolled or sprayed to the desired thickness. Sufficient flexibility is exhibited by the cured urethane or epoxy overlay to provide for application to curved surfaces. The machinability of the urethane or epoxy based coating is excellent.

Figure 2:
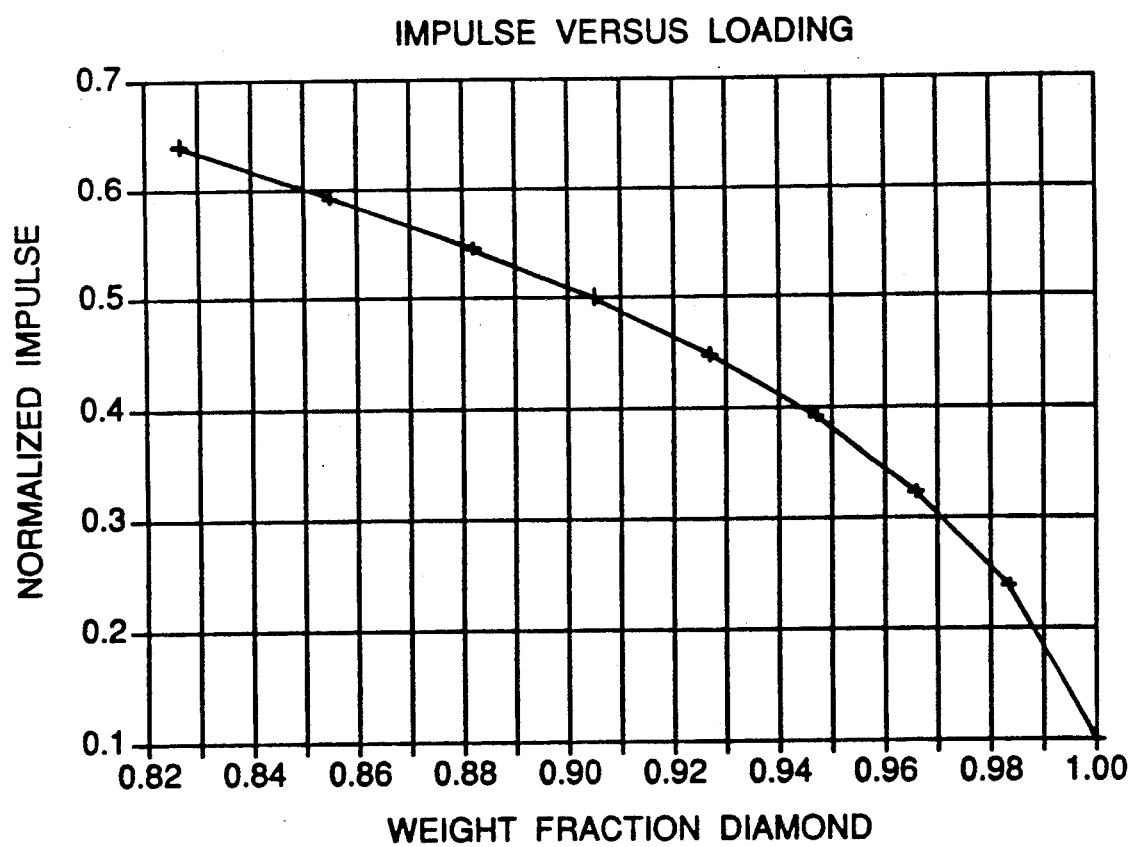
FIG. 2 is a curve showing the predicted performance of the materials provided in accordance with this invention.

The impulse versus loading performance curve is shown in FIG. 2 which shows the predicted decrease in impulse relative to pure urethane or epoxy. Approximately 90 weight percent of diamond is required to reduce the blow-off impulse by 50 percent.

The coating may be applied by spraying the urethane (or epoxy) and diamond mixture directly on to the substrate. The mixture comprises the urethane, the diamonds and a solvent. Methyl isobutal kektone (MiBk) was found to be the preferred solvent for spraying relatively thick coatings (up to 0.318 cm). Tresco No. 8 commercial thinner (MiBk + higher boiling point solvent) was appropriate for thin coatings (less than 0.076 cm for decoy applications. Typical batch mixes for diamond filled urethane are as follows:

EXAMPLE 1

70 g, 20 um diamonds
18 g urethane resin
13 ml MiBk solvent

EXAMPLE 2

75 g, 20 um diamonds
13.23 g urethane resin
20 ml MiBk solvent

Diamond filled urethane (DFU) coatings have been successfully sprayed with pigment weight fractions as high as 91 percent, however, the coating were found to have a tendency to crack. A pigment weight fraction of 85 percent was found to be nearly ideal for producing strong adherent coating on a carbon-carbon substrate.

While the foregoing specification describes certain preferred embodiments of this invention and the best mode known for providing a low impulse coating to a substrate, it will be recognized that this invention may be subject to various modifications and adaptations, and therefore it is intended that the invention be limited in scope only by the appended claims as interpreted in the light of the prior art.

What is claimed is:

1. For use as a decoy for a reentry vehicle subject to nuclear attack, the outer surface of said decoy being a substrate, the invention comprising: a coating for said substrate said coating comprising a mixture of diamond pigment in a binder of urethane; and wherein said mixture comprises 85 to 90 weight percent of diamond.

2. The invention as defined in claim 1 wherein said substrate is a carbon-carbon substrate.

3. The invention as in claim 2 wherein said mixture includes a solvent.

4. The invention as in claim 3 wherein said solvent includes methyl isobutal kektone.

5. The invention as defined in claim 3 wherein said mixture is comprised in the following ratio:
70g, 20um diamonds
18g, urethane resin
13ml solvent.

6. The invention as defined in claim 3 where said mixture is comprised in the following ratio:
75g, 20um diamonds
13.23g urethane resin
20ml solvent.

* * * * *